United States Patent
Kroll et al.

(10) Patent No.: US 6,269,688 B1
(45) Date of Patent: Aug. 7, 2001

(54) APPARATUS AND METHOD FOR TESTING TIRES

(75) Inventors: William P. Kroll, Medina; Karl J. F. Kroll, Maple Grove, both of MN (US)

(73) Assignee: Intercomp Company, Minneapolis, MN (US)

( * ) Notice: Subject to any disclaimer, the term of this patent is extended or adjusted under 35 U.S.C. 154(b) by 0 days.

(21) Appl. No.: 09/204,883

(22) Filed: Dec. 3, 1998

Related U.S. Application Data

(60) Provisional application No. 60/067,542, filed on Dec. 4, 1997.

(51) Int. Cl.[7] .................................................. G01M 17/02
(52) U.S. Cl. ............................................................. 73/146
(58) Field of Search ........................... 73/11.04, 862.454, 73/146, 8, 9; 157/1.17, 1.1, 1.2, 1.26, 1.28, 14, 16, 17, 21; 152/170, 214, 215 R, 216

(56) References Cited

U.S. PATENT DOCUMENTS

| | | | |
|---|---|---|---|
| 4,969,355 | * | 11/1990 | Doi et al. ................................ 73/146 |
| 6,076,586 | * | 6/2000 | Hans .................................... 157/1.17 |

* cited by examiner

*Primary Examiner*—William Oen
(74) *Attorney, Agent, or Firm*—Skinner and Associates

(57) ABSTRACT

A tire test apparatus, comprising a base, a support, a force applicator, a tire contact member in contact with a tire, a travel indicator mechanism, and a force indicator mechanism. The support extends upwardly from the base and holds a tire a predetermined distance above the base. The force applicator applies a force to cause pressure between the tire and the tire contact member. The travel indicator mechanism quantifies a change in relative positions between the tire and the tire contact member. The force indicator mechanism quantifies the force applied by the force applicator.

18 Claims, 9 Drawing Sheets

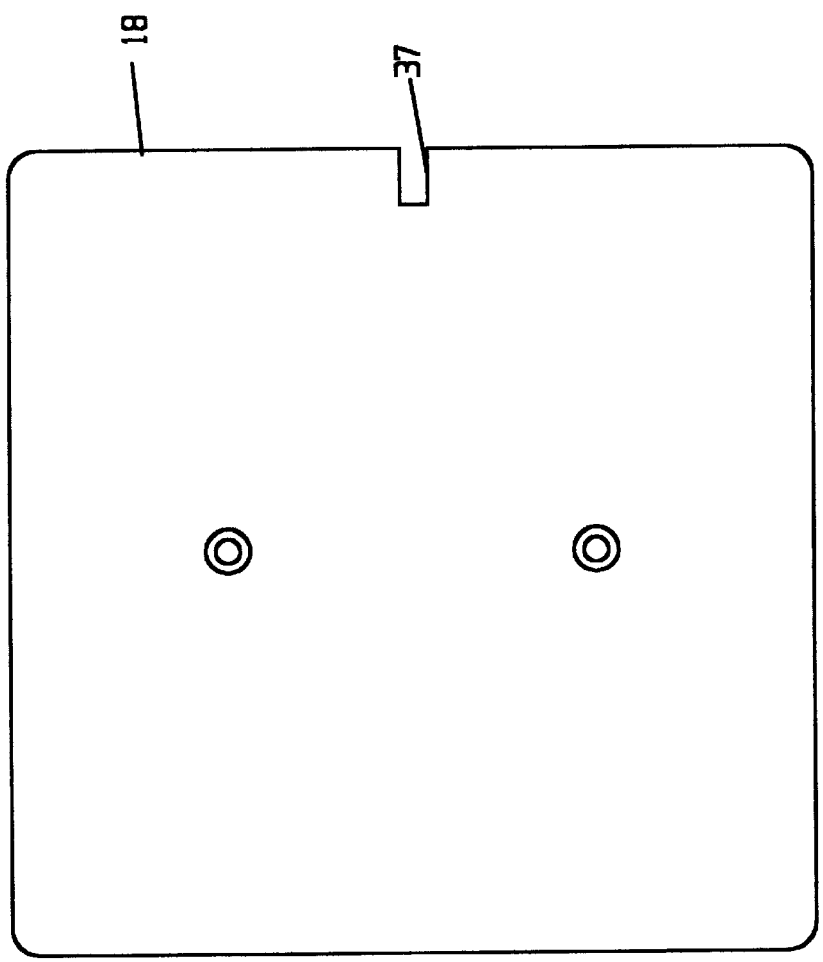
FIG. 6
FIG. 7

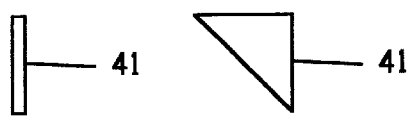
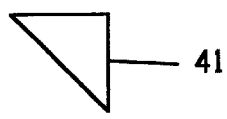
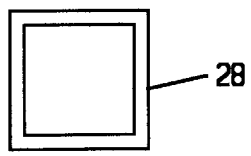
FIG. 16  FIG. 15  FIG. 13  FIG. 11
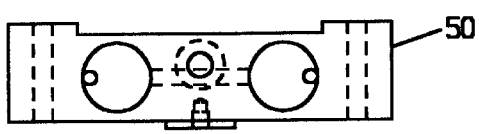
FIG. 17
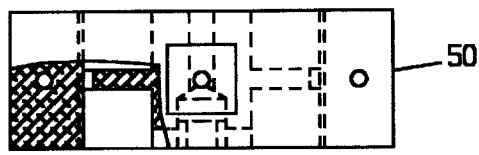
FIG. 18
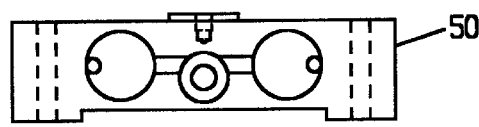
FIG. 19
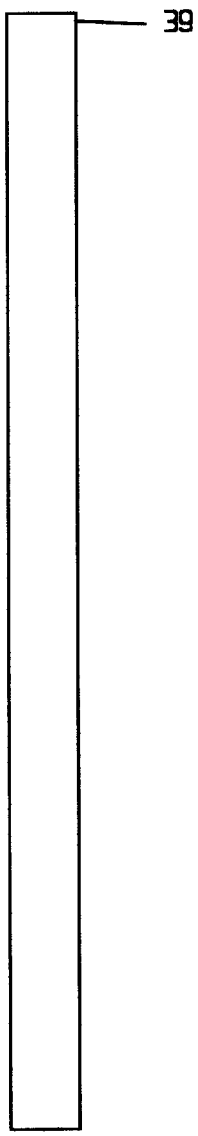
FIG. 14
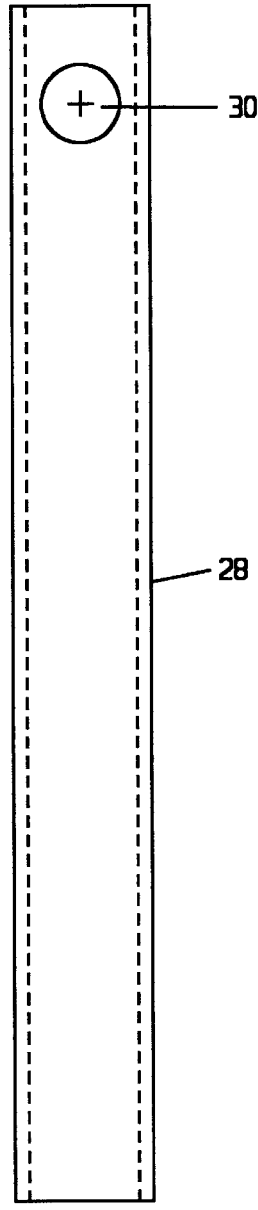
FIG. 12

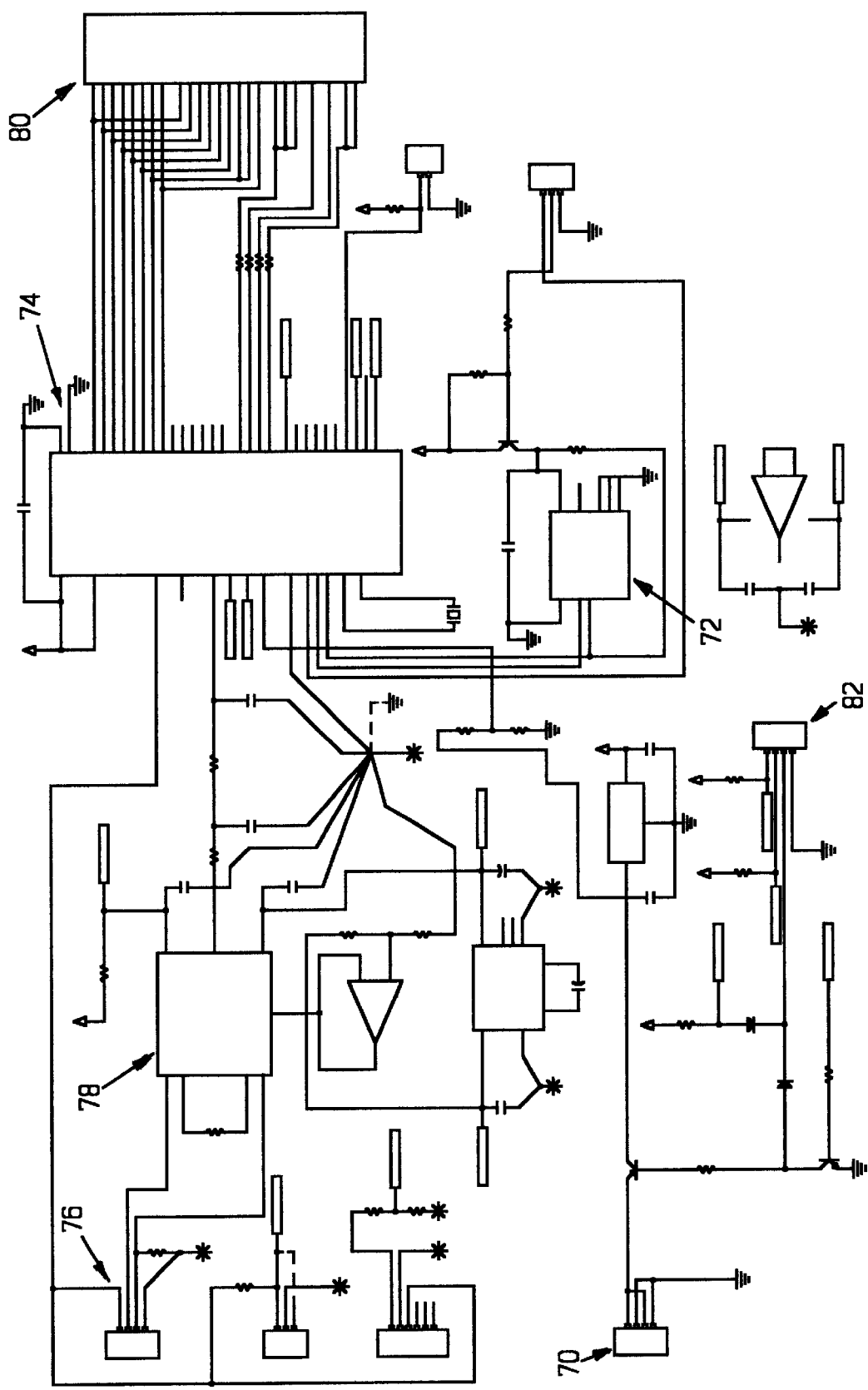

APPARATUS AND METHOD FOR TESTING TIRES

CROSS-REFERENCE TO RELATED APPLICATIONS, IF ANY

This application claims the benefit under 35 U.S.C. §119 (e) of provisional application Ser. No. 60/067,542, filed Dec. 4, 1997.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to testing apparatus and methods. More particularly, the invention relates to electromechanical testing apparatus for measuring the spring rate of automobile or kart tires.

2. Background Information

Balancing a car optimizes performance, particularly the cornering characteristics of a racing class automobile. The traction, adherence or grip between the tires and the track at each end of a car is proportional to the percentage of the weight at that end of the car. A car's grip is optimized when both the front tires and the rear tires begin to slide at the same time and at the same rate, resulting in the car having responsive, near-neutral handling characteristics. However, if the front tires slide first, the car tends to understeer and slide off of the track, and if the rear tires slide first, the car tends to oversteer and spin.

Numerous factors contribute to the near-neutral handling characteristics of a balanced car, including tires, wheel alignment, suspension, weight distribution, center of gravity and aerodynamics. A properly suspended car has more braking and acceleration control when the car is moving in a straight line and more steering control when the car is maneuvering around corners.

The spring rate of tires produced with current manufacturing practices vary considerably. For example, a tire produced earlier in the day using a particular tire molding machine will have considerably different characteristics than a tire produced later in the day using the same machine. Additionally, different portions of the same tire may have different characteristics. For example, a particular tire may have soft spots. It is therefore desirable to be able to accurately rate the tires, including the different portions of the tires, in order to balance the car and ultimately improve the handling characteristics of the car.

Applicant's invention provides an apparatus and method for testing and measuring the spring rate of tires which is believed to constitute an improvement over existing technology.

BRIEF SUMMARY OF THE INVENTION

The present invention provides an apparatus and method for testing the spring rate of tires. The tire test apparatus generally comprises a base, a support, a force applicator, a tire contact member in contact with a tire, a travel indicator mechanism, and a force indicator mechanism. The support extends upwardly from the base and holds a tire a predetermined distance above the base. The force applicator causes the tire and the tire contact member to apply pressure against each other. The force applicator is preferably a hydraulic jack. The travel indicator mechanism quantifies the change in the relative position of the tire contact member with respect to the tire upon application of a force. The force indicator mechanism quantifies the force applied by the force indicator mechanism. The travel indicator mechanism and the force indicator mechanism preferably have digital displays that allow the user to accurately rate the tire. The tire tester of the preferred embodiment has a capacity of 2500 lb. or 1250 kg.

The features, benefits and objects of this invention will become clear to those skilled in the art by reference to the following description, claim and drawings.

BRIEF DESCRIPTION OF THE SEVERAL VIEWS OF THE DRAWING

FIG. 6 is a top view of the platform for the apparatus of FIG. 1.

FIG. 7 is a side view of the platform of FIG. 6.

FIG. 11 is a top view of the mast for the apparatus of FIG. 1.

FIG. 12 is a side view of the mast of FIG. 11.

FIG. 13 is a top view of the stiffening spline for the apparatus of FIG. 1.

FIG. 14 is a side view of the stiffening spline of FIG. 13.

FIG. 15 is a side view of a gusset for the apparatus of FIG. 1.

FIG. 16 is a front view of the gusset of FIG. 15.

FIG. 17 is a side view of the load cell for the apparatus of FIG. 1.

FIG. 18 is a bottom view of the load cell of FIG. 17.

FIG. 19 is an opposite side view of the load cell of FIG. 17.

FIG. 35 is a schematic of the electronic circuitry for the apparatus of FIG. 1

DETAILED DESCRIPTION

Figure 1:
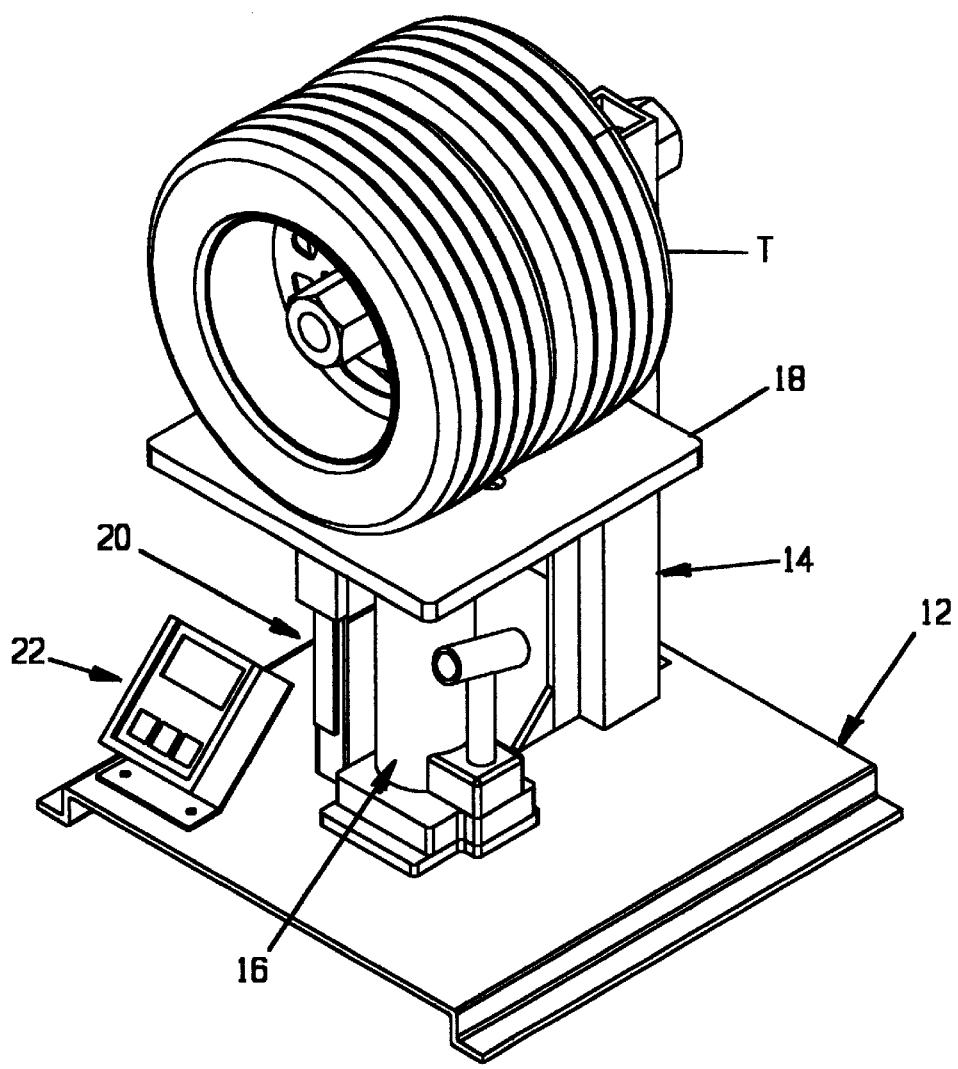
FIG. 1 is perspective view of one embodiment of the apparatus of the present invention.
Figure 2:
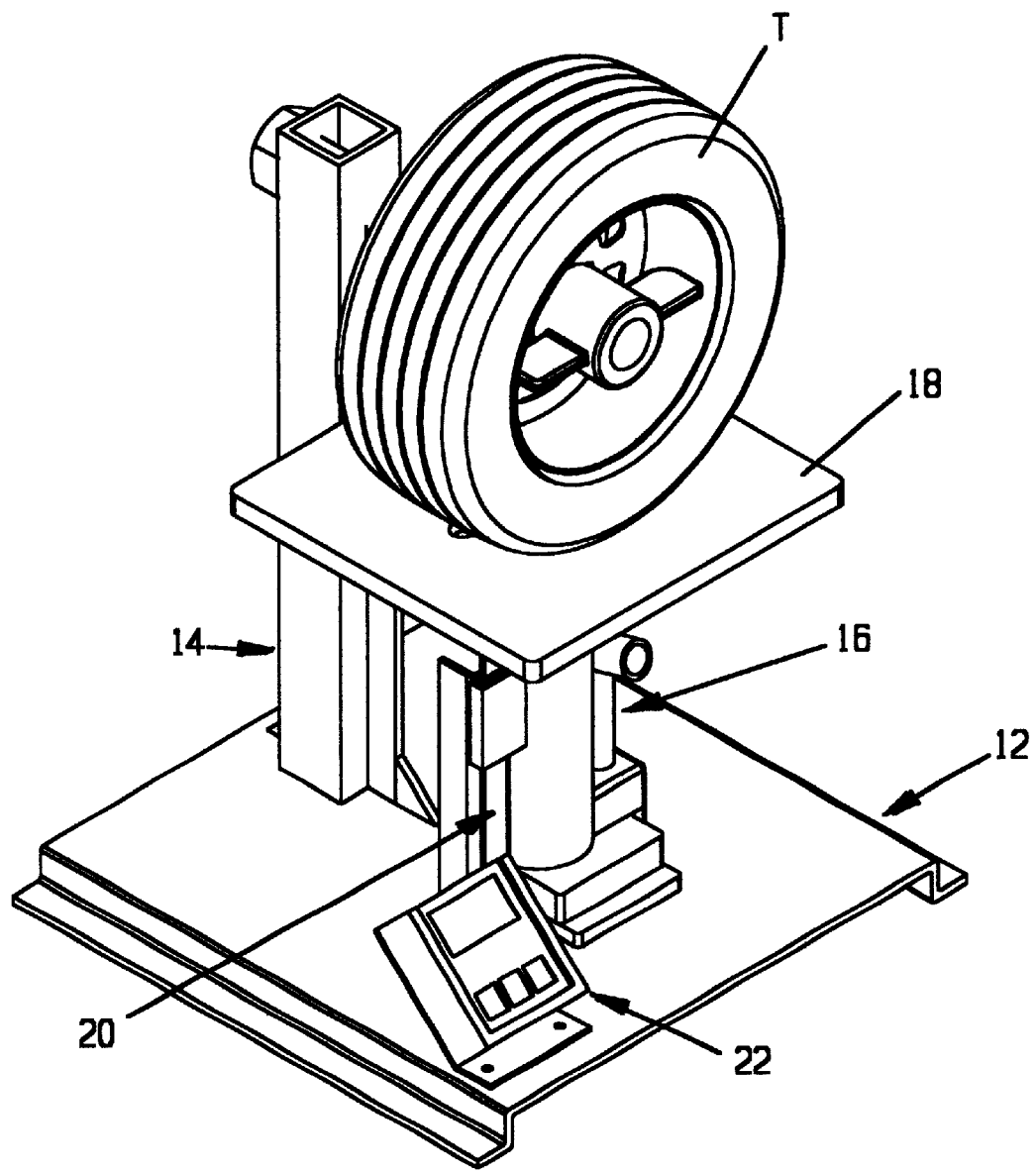
FIG. 2 is a perspective view of another embodiment of the apparatus of the present invention.
Figure 3:
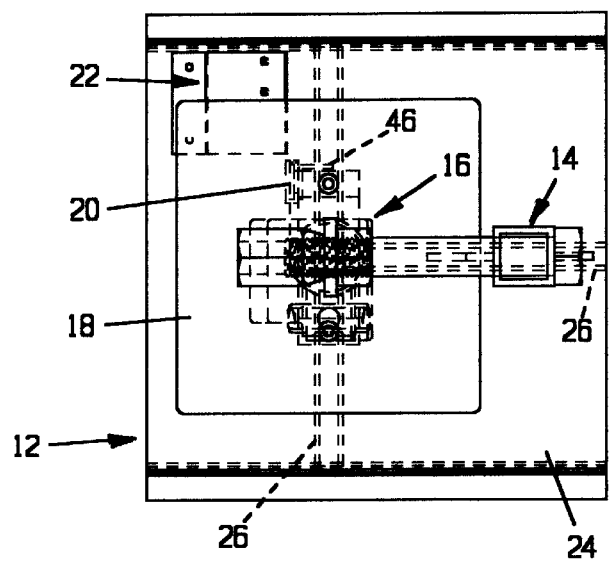
FIG. 3 is a top view of the apparatus of FIG. 1.
Figures 4, 5:
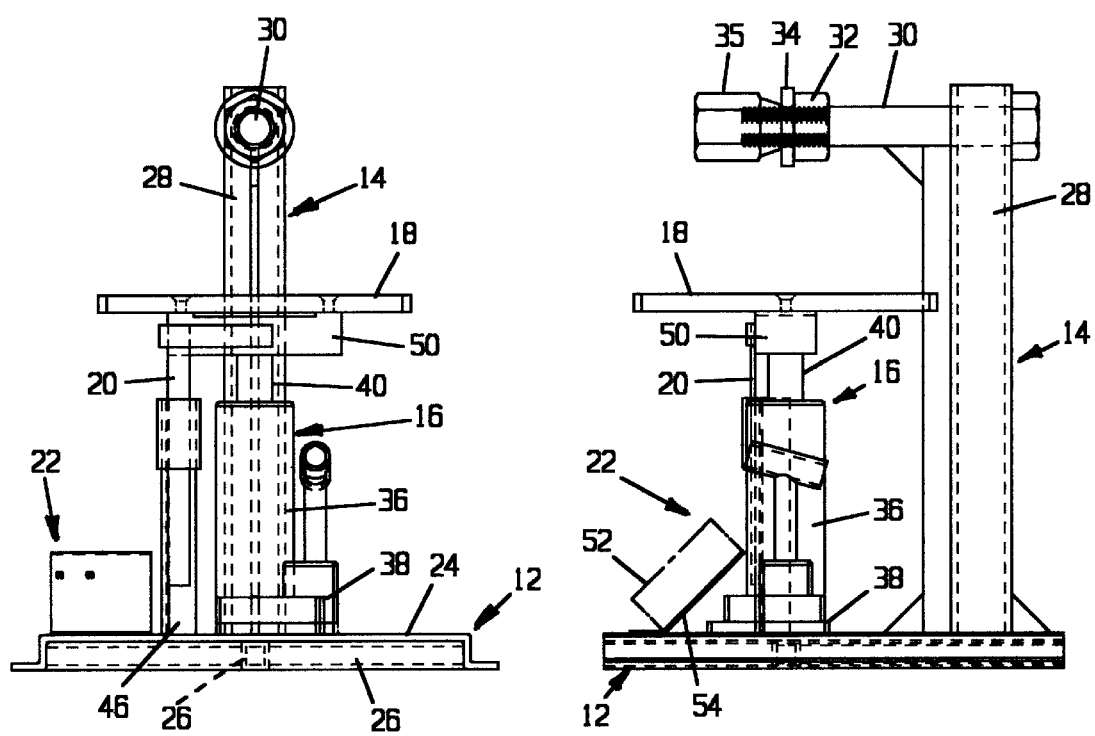
FIG. 4 is a side view of the apparatus of FIG. 1.
FIG. 5 is a front view of the apparatus of FIG. 1.

Referring to FIGS. 1 and 2, examples of the preferred embodiments of the present invention are illustrated. FIG. 1 shows a tire tester 10 used to measure the spring rate of smaller kart tires T. FIG. 2 shows a tire tester 10 used to measure the spring rate of larger automobile tires T. The remaining figures further illustrate the tire tester 10 of FIG. 1, but may be modified to form the embodiment shown in FIG. 2.

Referring to FIGS. 1–5, preferred embodiments of the tire test apparatus 10 generally comprise a base 12, a support 14 extending upwardly from the base 12 for adjustably holding a tire T a predetermined distance above the base 12, a force applicator 16, preferably a hydraulic jack, having a tire contact member 18 for contacting the tire T and applying force thereto, a travel indicator mechanism 20, preferably digital, connected to the base 12 and contacting the tire contact member 18, and a force indicator mechanism 22, preferably digital, connected to the force applicator 16.

Figure 8:
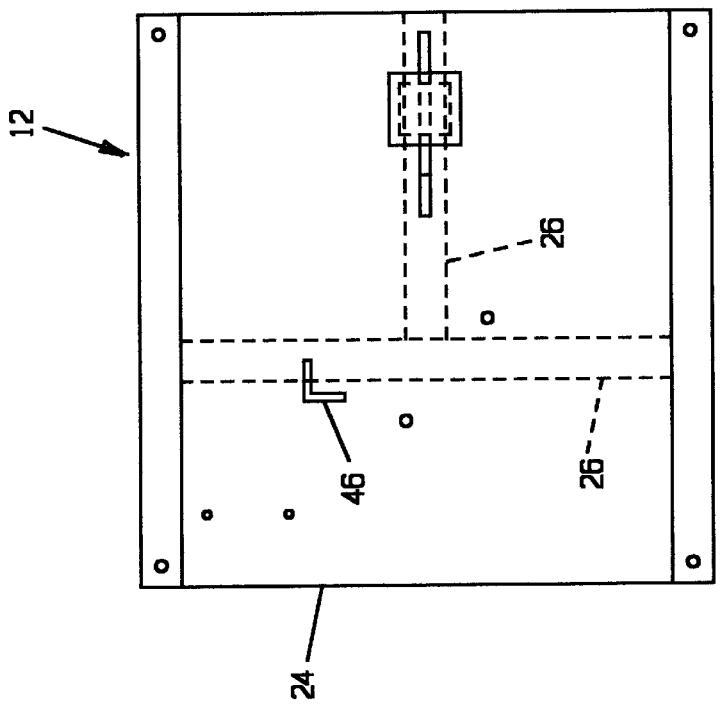
FIG. 8 is a top view of the base for the apparatus of FIG. 1.
Figure 9:
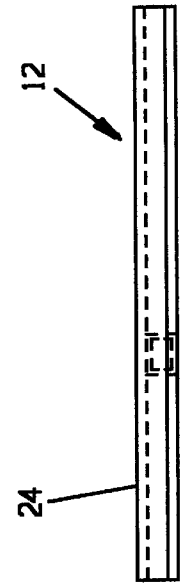
FIG. 9 is a side view of the base of FIG. 8.
Figure 10:
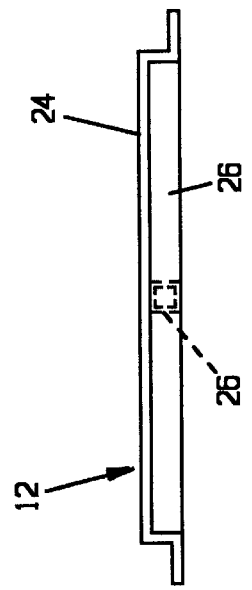
FIG. 10 is a front view of the base of FIG. 8.

The base 12, shown in more detail in FIGS. 8–10, is preferably rigid and includes an inverted u-shaped plate 24 and a pair of perpendicular base supports 26 positioned within a cavity beneath the plate 24. The base supports 26 provide the apparatus with structural strength.

Figure 20:
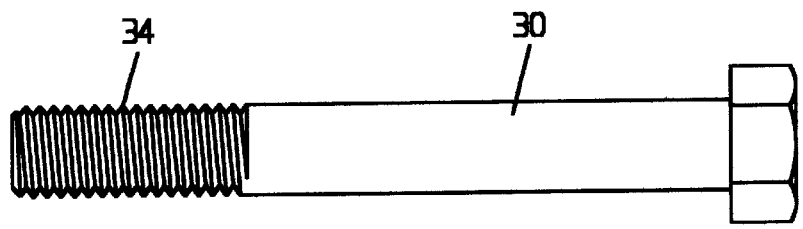
FIG. 20 is a side view of shaft bolt for the apparatus of FIG. 1.
Figure 21:
FIG. 21 is a side view of the hex jam nut for the apparatus of FIG. 1.
Figure 22:
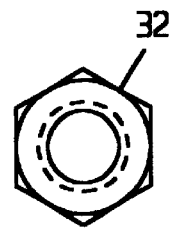
FIG. 22 is a front view of the hex jam nut of FIG. 21.
Figure 23:
FIG. 23 is a side view of the offset backing ring for the apparatus of FIG. 1.
Figure 24:
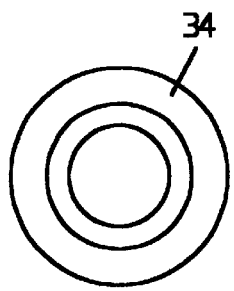
FIG. 24 is a front view of the offset backing ring of FIG. 23.
Figure 25:
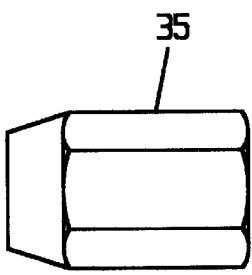
FIG. 25 is a side view of the tightening cone for the apparatus of FIG. 1.
Figure 26:
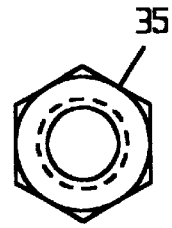
FIG. 26 is a front view of the tightening cone of FIG. 25.

The support 14 is preferably rigid and extends upwardly perpendicular to the base 12. The support 14 includes a mast 28, shown in FIGS. 11 and 12, and a shaft, preferably a shoulder bolt 30, shown in FIG. 20. The mast 28 has at least one aperture 30 through which the shoulder bolt 30 may extend. The bolt 30 extends through the hub of the tire T and suspends the tire T a predetermined distance above the base 12. Multiple apertures 30 spaced along the mast 28 would accommodate tires of varying diameters. A jam nut 32, shown in FIGS. 21 and 22, may be screwed onto the threads 34 of the bolt 30 and an offset backing ring 34, shown in FIGS. 23 and 24, may be slid onto the bolt 30. The suspended tire T is secured onto the bolt 30 by screwing a tightening cone 35, shown in FIGS. 25 and 26, onto the threads.

The force applicator 16 of the preferred embodiments preferably includes a hydraulic jack 36, although other jacks or means to apply force may be used. The jack 36 has a mount 38 attached to the base 12 and has a piston 40 attached to the tire contact member 18. The jack 36 is manually pumped to raise the tire contact member 18 and apply pressure to a suspended tire T on the shoulder bolt 30. The tire contact member 18 of the preferred embodiments is shown in greater detail in FIGS. 6 and 7. The tire contact member 18 is generally a plate that has two screw apertures used to attach a load cell, which is discussed below with respect to the force indicator mechanism. The tire contact member 18 also has a slot 37 through which a spline 39, shown in FIGS. 13 and 14, can extend to stiffen the plate when it is being raised and lowered by the jack 36. The stiffening spline 39 extends, and is preferably welded, along the side of the mast 28 up to the aperture. Gussets 41, such as those shown in FIGS. 15 and 16, may be used to secure the spline 39 to the bolt 30, or to secure the spline 39 and mast 28 to the base 12.

Figure 33:
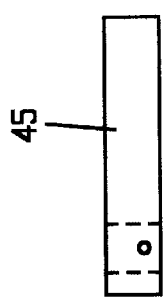
FIG. 33 a side view of the displacement indicator arm for that apparatus of FIG. 1.
Figure 34:
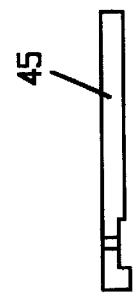
FIG. 34 a bottom view of the displacement indicator arm of FIG. 33.
Figure 32:
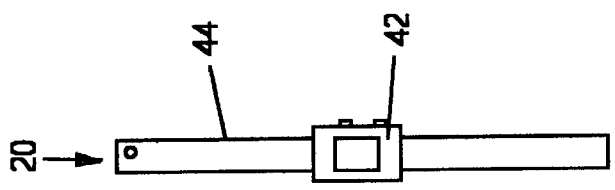
FIG. 32 is a front view of the displacement measurement gauge of FIG. 31.
Figure 31:
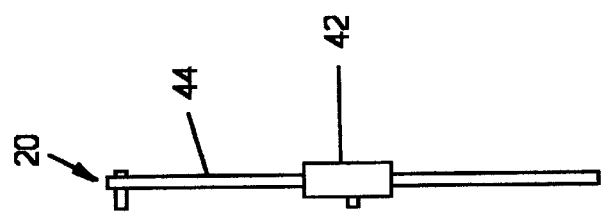
FIG. 31 is a side view of the displacement measurement gauge for the apparatus of FIG. 1.
Figure 29:
FIG. 29 is a top view of the indicator support for the apparatus of FIG. 1.
Figure 30:
FIG. 30 is a side view of the indicator support of FIG. 29.

The travel indicator mechanism 20, shown in more detail in FIGS. 31 and 32, includes a digital indicator device 42 and a slide 44. The digital indicator device 42 cooperates with and slides over the slide 44 in a measured fashion to quantify the position of the tire contact member 18. The digital indicator device 42 is preferably a magnetic ravel indicator that has a display readout for reporting the vertical position of the tire contact member 18 in either English or metric units. The digital indicator device 42 may be reset or initialized to 0.000 inches and can display the tire compression length to the nearest 0.001 inches or 0.01 millimeter. The slide 44 is preferably connected to the tire contact member 18 using the displacement indicator arm 45, shown in FIGS. 33 and 34 and the digital indicator device 42 is mounted a predetermined distance above the base 12 through an aperture within an angled indicator support 46, shown in FIGS. 29 and 30.

Figure 27:
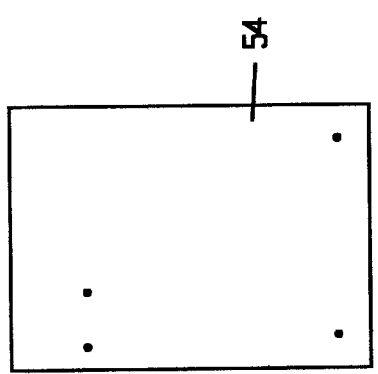
FIG. 27 is an unbent, planar view of the indicator mounting bracket for the apparatus of FIG. 1.
Figure 28:
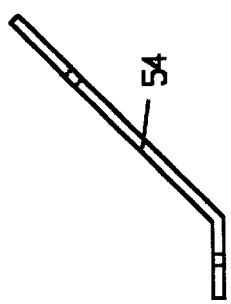
FIG. 28 is a side view of the indicator mounting bracket of FIG. 27.

The force indicator mechanism 22 includes a load cell 50, shown in FIGS. 17, 18 and 19 electrically connected to a force indicator display 52, which is mounted onto the base using the mounting bracket 54 shown in FIGS. 27 and 28. The force indicator display 52 is preferably a ½ inch, four digit LCD display. The load cell 50 is attached and positioned between the piston 40 and the tire contact member 18.

FIG. 35 is a schematic diagram of the electronic controls for the present invention. The circuitry contains a power supply, which is in this case a 9 volt alkaline or rechargeable nickel-cadmium battery 70, an EEPROM 72 for holding a program and calibration data, a microcontroller 74 for performing the operations of the program and for performing analog/digital conversions, a load cell input 76 for sensing or reading the strain gauges of the load cell 50, a signal amplifier 78 for amplifying and conditioning the signals form the load cell input 76, a LCD display output connector 80 for electrically interfacing with and driving the force indicator display 52, and a keypad input connector 82 for electrically interfacing with a keypad or other input device. The microcontroller 74 delivers over 4,000 internal counts with its 12 bit analog/digital conversions and allows the tire tester 10 to automatically zero off errors found during zero-load.

The tire tester contains an on/off control, a zero control for zeroing the weight of he scale, a pound/kilogram toggle control, and a peak hold control wherein the unit will display only the highest weight applied to the pad. The tire tester also includes an Auto Zero Tracking feature which corrects for slight zero changes during normal operation.

Other embodiments of the tire tester are anticipated. For example, rather than pumping the jack to raise the tire contact member into contact with the tire, it is anticipated that the jack could be mounted in such a manner as to lower the tire into contact with a stationary tire contact member. Additionally, the design of the tire tester, particularly the support and the contact member, maybe modified to accommodate various tire types and sizes or various testing procedures.

There are a number of procedures for testing or rating a tire, or for finding soft spots on portions of the tire. The tire tester may be used in a variety of these procedures. A method for using the tire tester to rate a tire may include the following steps:

(1) Mount the tire to be rated on a support next to a tire contact member.

(2) Zero both the travel indicator mechanism and the force indicator mechanism.

(3) Pump the jack to apply pressure between the tire and the tire contact member.

(4) Read a change in the relative position between the tire and the tire contact member as measured by the travel indicator mechanism.

(5) Read the compression weight as measured by the force indicator mechanism.

The result of this design is that the tire tester is accurate to within plus or minus 0.5% of the applied load.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A tire test apparatus, comprising:
   (a) a base;
   (b) a support extending upwardly from said base for holding a tire;
   (c) a tire contact member in contact with the tire;
   (d) a force applicator for applying a force to cause pressure between the tire and said tire contact member;
   (e) a travel indicator mechanism for quantifying a change in relative positions between the tire and said tire contact member; and
   (f) a force indicator mechanism for quantifying the force applied by said force applicator.

2. The tire test apparatus of claim 1, wherein said base is rigid and includes an inverted unshaped plate forming a cavity beneath said plate and a pair of perpendicular base supports positioned within said cavity.

3. The tire test apparatus of claim 1, wherein said support is rigid and extends perpendicular to said base.

4. The tire test apparatus of claim 1, wherein said support includes a mast and a shaft, said mast having at least one aperture through which said shaft may extend, said shaft extending through the tire, each of said at least one aperture being positioned a predetermined distance above said base.

5. The tire test apparatus of claim 4, wherein said shaft is a shoulder bolt with external threads, said support further includes a jam nut screwed onto said external threads, an offset backing ring through which said shoulder bolt extends, and a tightening cone screwed onto said external threads, whereby tightening said tightening cone secures the tire on said shoulder bolt and to said support of said apparatus.

6. The tire test apparatus of claim 1, wherein said force applicator includes a jack, said jack having a mount attached to said base and further having a piston attached to said tire contact member to force said tire contact member against the tire.

7. The tire test apparatus of claim 1, wherein said force applicator includes a jack, said jack having a mount attached to said support and further having a piston connected to the tire to force the tire against said tire contact member.

8. The tire test apparatus of claim 1, wherein said travel indicator mechanism includes a digital indicator device and a slide, said digital indicator device cooperating with and sliding with respect to said slide in a measured fashion.

9. The tire test apparatus of claim 8, wherein said digital indicator device is a magnetic travel indicator.

10. The tire test apparatus of claim 8, wherein said digital indicator device has a display readout for reporting said change in relative position between the tire and said tire contact member.

11. The tire test apparatus of claim 10, wherein said display readout reports said change in relative position in either English or metric units.

12. The tire test apparatus of claim 11, wherein said display readout may be initialized to 0.000.

13. The tire test apparatus of claim 8, wherein said digital indicator device accurately measures said change in relative position to within 0.001 inches.

14. The tire test apparatus of claim 8, wherein said slide is connected to said tire contact member and said digital indicator device is mounted a predetermined distance above said base.

15. The tire test apparatus of claim 1, wherein said force indicator mechanism includes a load cell electrically connected to a force indicator display, said force applicator including a jack with a piston, said load cell being attached and positioned between said piston and said tire contact member.

16. A tire test apparatus, comprising:
   (a) a base;
   (b) a support extending upwardly from said base for holding a tire a predetermined distance above said base, said support including a mast and a shaft, said mast having at least one aperture through which said shaft may extend, said shaft extending through the tire, each of said at least one aperture being positioned a predetermined distance above said base;
   (c) a tire contact member in contact with the tire, said tire contact member having a vertical position with respect to said base;
   (d) a force applicator having a tire contact member in contact with the tire, said force applicator applying a force to the tire through said tire contact member, said force applicator including a jack, said jack having a mount attached to said base and further having a piston attached to said tire contact member;
   (e) a travel indicator mechanism being connected to said base and being in contact with said tire contact member, said travel indicator mechanism including a digital indicator device and a slide, said digital indicator device cooperating with and sliding over said slide in a measured fashion, said digital indicator device quantifying said position of said tire contact member; and (f) a force indicator mechanism being connected to said force applicator, said force indicator mechanism including a load cell electrically connected to a force indicator display, said load cell being attached to and positioned between both said piston and said tire contact member.

17. A tire testing apparatus for measuring the spring rate of tires, comprising:

(a) a base;

(b) a support extending upwardly from said base for holding a tire a predetermined distance above said base, said support including a mast and a shaft, said mast having at least one aperture through which said shaft may extend, said shaft extending through the tire, each of said at least one aperture being positioned a predetermined distance above said base;

(c) a tire contact member in contact with the tire, said tire contact member having a vertical position with respect to said base;

(d) a force applicator having a tire contact member in contact with the tire, said force applicator applying a force to the tire through said tire contact member, said force applicator including a jack, said jack having a mount attached to said base and further having a piston attached to said tire contact member;

(e) a travel indicator mechanism being connected to said base and being in contact with said tire contact member, said travel indicator mechanism including a magnetic digital indicator device and a slide, said magnetic digital indicator device cooperating with and sliding over said slide in a measured fashion, said magnetic digital indicator device quantifying said position of said tire contact member, said magnetic digital indicator device having a display readout for reporting said vertical position of said tire contact member, said slide being connected to said tire contact member and said magnetic digital indicator device being mounted a predetermined distance above said base; and (f) a force indicator mechanism being connected to said force applicator, said force indicator mechanism including a load cell electrically connected to a force indicator display, said load cell being attached to and positioned between both said piston and said tire contact member.

18. A method of measuring the spring rate of a tire using a tire tester having a platform, a travel indicator mechanism, a force indicator mechanism, a jack and a contact member, comprising the steps of:

(a) placing the tire on a center of a platform of the tire tester;

(b) zeroing the travel indicator mechanism and the force indicator mechanism;

(c) actuating the jack to compress the tire via the contact member and the platform;

(d) reading a change in relative position between the tire and the tire contact member as measured by the travel indicator mechanism; and (e) reading a compression weight as measured by the force indicator mechanism.

* * * * *